United States Patent
Reatherford et al.

(10) Patent No.: US 7,117,849 B1
(45) Date of Patent: Oct. 10, 2006

(54) DIRECT GASEOUS FUEL INJECTOR

(75) Inventors: Larry Reatherford, Clarkston, MI (US); Carl Johnson, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/285,998

(22) Filed: Nov. 22, 2005

(51) Int. Cl.
*F02M 59/46* (2006.01)
*B05B 15/00* (2006.01)

(52) U.S. Cl. .................................. 123/467; 239/132.3
(58) Field of Classification Search ................ 123/467, 123/472, 295, 300, 305; 239/132.3, 533.12, 239/533.2, 533.11
See application file for complete search history.

(56) References Cited

U.S. PATENT DOCUMENTS

| | | | |
|---|---|---|---|
| 4,245,589 A | | 1/1981 | Ryan |
| 4,782,794 A | | 11/1988 | Hsu et al. |
| 5,101,794 A | | 4/1992 | Van Blaricom |
| 5,192,048 A | * | 3/1993 | Wakeman ............... 251/129.16 |
| 5,263,645 A | * | 11/1993 | Paul et al. .................. 239/124 |
| 5,423,484 A | | 6/1995 | Zuo |
| 5,497,743 A | * | 3/1996 | Clarke ........................ 123/294 |
| 5,551,391 A | * | 9/1996 | Beck et al. .................. 123/305 |
| 6,045,063 A | * | 4/2000 | Koike et al. ............. 239/533.3 |
| 6,640,773 B1 | * | 11/2003 | Ancimer et al. ............ 123/299 |
| 2003/0155432 A1 | * | 8/2003 | Buchanan et al. ....... 239/132.3 |
| 2004/0011323 A1 | * | 1/2004 | Hilger et al. ................ 123/298 |
| 2004/0036048 A1 | | 2/2004 | Petersen |
| 2004/0211846 A1 | | 10/2004 | Chenanda et al. |
| 2005/0279321 A1 | | 12/2005 | Crawford et al. |
| 2006/0081722 A1 | | 4/2006 | Kato et al. |
| 2006/0086825 A1 | | 4/2006 | Date et al. |

* cited by examiner

*Primary Examiner*—Mahmoud Gimie
(74) *Attorney, Agent, or Firm*—Gary A. Smith

(57) ABSTRACT

A fuel injector. The fuel injector can include a fuel channel configured to receive pressurized gaseous fuel from a fuel rail, and a nozzle in fluid communication with the fuel channel, wherein the nozzle includes tapered portions configured to be seated adjacent a cylinder head. The fuel injector can also include a pintle having an opened position and a closed position, wherein pressurized gaseous fuel is introduced from the nozzle directly into a combustion chamber when the pintle is in the opened position and wherein introduction of the pressurized gaseous fuel is substantially blocked when the pintle is in the closed position. The fuel injector can also include a pintle controller configured to selectively move the pintle between the closed position and the opened position.

21 Claims, 2 Drawing Sheets

DIRECT GASEOUS FUEL INJECTOR

FIELD

The present disclosure is directed toward a fuel injector for injecting gaseous fuel directly into a cylinder of an internal combustion engine.

BACKGROUND AND SUMMARY

Internal combustion engines convert chemical energy in a fuel to mechanical energy. As part of the conversion, the fuel can be combusted, thus causing hot combustion products to expand within the engine. The expansion of the combustion products can be used to move mechanical components of the engine, such as pistons. Combustion reactions can have several products, or emissions, some of which can be undesirable. For example, when hydrocarbons are used as fuel, combustion products can include HC, CO, $CO_2$ and $NO_x$.

In an attempt to reduce emissions, efforts have been made to utilize substantially carbon-free hydrogen as a combustion fuel instead of hydrocarbons. When hydrogen ($H_2$) is used as the fuel, there is not a substantial amount of HC, CO, or $CO_2$ emissions, because the fuel does not include carbon that can be turned into HC, CO, or $CO_2$. Therefore, hydrogen fuel is currently viewed as a good fuel choice for environmentally clean engines.

The inventor herein has recognized that it can be difficult to achieve a desired air-to-fuel ratio when hydrogen is used as a combustion fuel. In particular, it can be difficult to introduce enough air into the cylinder relative to the amount of fuel in the cylinder. Unlike more conventional liquid fuels, hydrogen gas can occupy a significant volume within a cylinder, thus limiting the volume available for air at a given pressure.

Others have attempted to address this problem by using direct cylinder fuel injection so that a full charge of air can be introduced to a cylinder and effectively trapped within the cylinder before hydrogen is injected. In this manner, the cylinder contains a full charge of air, and the injected hydrogen simply increases the pressure within the cylinder. Thus far, direct hydrogen fuel injectors have evolved from existing injectors designed to inject other fuels, such as natural gas or propane.

The inventor herein has recognized that the design and material selection for various components in such direct hydrogen fuel injectors are inadequate for hydrogen fuel applications. Using such injectors, internal failures such as seizing, galling, and leakage can cause rough running and misfiring in as little as five hours of operation.

At least some of the issues associated with direct hydrogen fuel injection may be addressed by a fuel injector including a fuel channel configured to receive pressurized gaseous fuel from a fuel rail, a nozzle in fluid communication with the fuel channel, and including tapered portions configured to be seated adjacent a cylinder head, a pintle having an opened position and a closed position, wherein pressurized gaseous fuel is introduced from the nozzle directly into a combustion chamber when the pintle is in the opened position and wherein introduction of the pressurized gaseous fuel is substantially blocked when the pintle is in the closed position, and a pintle controller configured to selectively move the pintle between the closed position and the opened position. In this manner, the fuel injector may be at least partially shielded from the heat of the combustion reaction.

At least some of the issues associated with direct hydrogen fuel injection may be addressed by a fuel injector that includes a gas dampener including a first portion that moves with the pintle and a second portion that is fixed relative the nozzle, wherein a gas cushion exists between the first and second portions when the pintle is in the opened position, and wherein the gas cushion at least partially limits the first portion and the second portion moving toward one another, thereby at least partially slowing the pintle as it moves from the opened position to the closed position. In this manner, the fuel injector life may be improved by decreasing the force with which the pintle closes.

At least some of the issues associated with direct hydrogen fuel injection may be addressed by a fuel injector that includes a gas bearing assembly configured to align the pintle relative the nozzle. A gas bearing assembly may have a longer effective lifetime than another type of bearing arrangement when operating with a less lubricating gaseous fuel.

At least some of the issues associated with direct hydrogen fuel injection may be addressed by a fuel injector that includes a bearing mechanism located proximate the nozzle and configured to align the pintle relative the nozzle. The proximity of the bearing arrangement to the nozzle opening may help create a better seal than if only a bearing arrangement located distal the nozzle is used.

DETAILED DESCRIPTION

The present disclosure is directed to a fuel injector for injecting gaseous fuel in an internal combustion engine. While hydrogen ($H_2$) is used as an example gaseous fuel, the present disclosure should not be limited to hydrogen fuel injectors. The concepts disclosed herein can also apply to other gaseous fuels.

Figure 1:
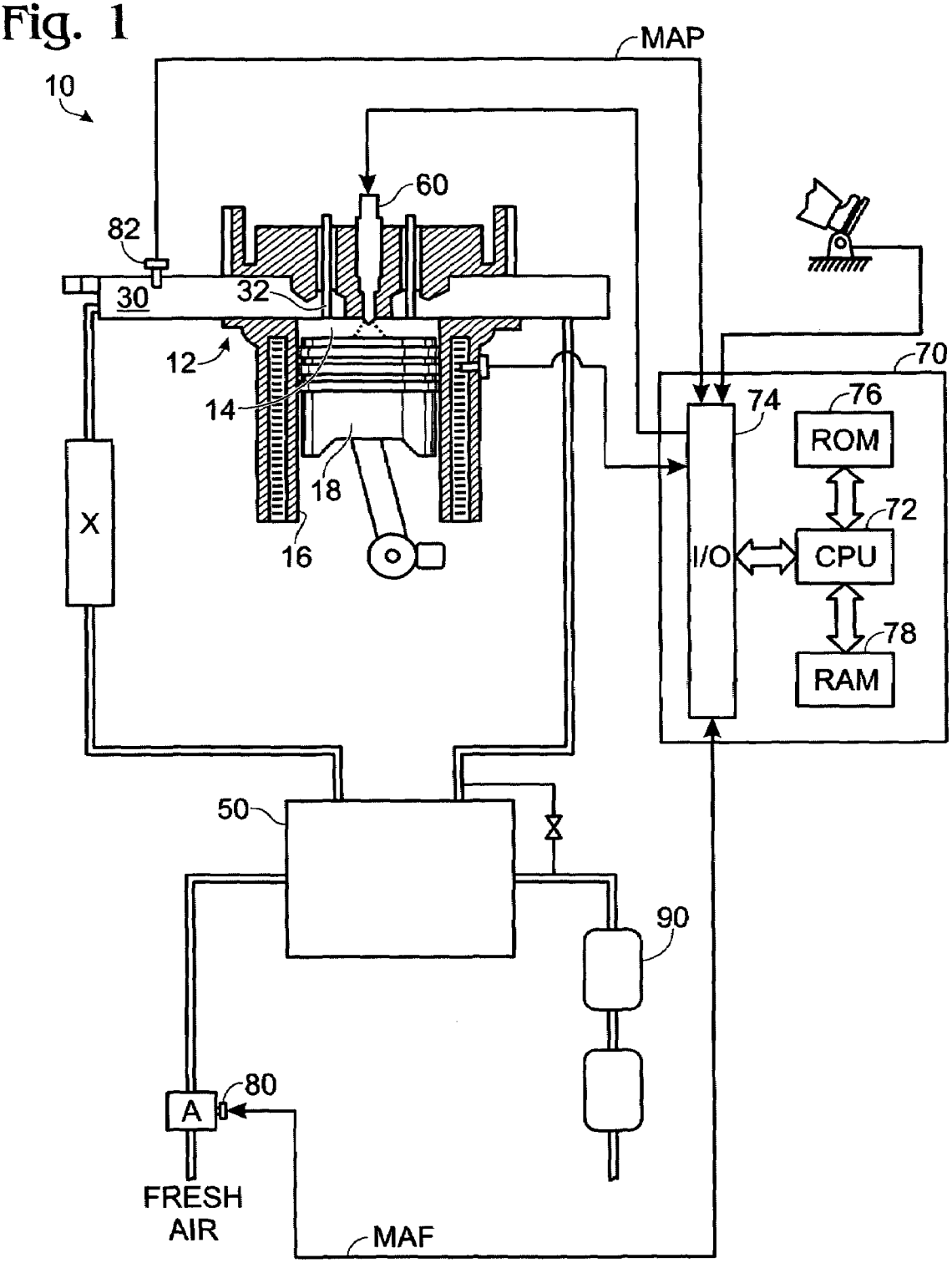
FIG. 1 schematically shows a hydrogen fueled internal combustion engine.

FIG. 1 schematically shows an internal combustion engine 10 that is configured to convert hydrogen fuel into mechanical energy. Engine 10 may include one or more cylinders, one of which is illustrated at 12. Cylinder 12 includes a combustion chamber 14 at least partially defined by cylinder walls 16 and a moveable piston 18.

Combustion chamber 14 is in fluid communication with an air intake manifold 30 via intake valve 32. The air intake manifold can be used to deliver air, including oxygen ($O_2$), to the combustion chamber for combustion. The intake valve can be controlled so that a desired flow of air enters the combustion chamber at a desired time, while at the same time preventing undesired backflow. In some embodiments, engine 10 can include a booster 50, which can be used to increase the pressure of air delivered to the combustion chamber, thereby increasing the relative mass of $O_2$ available for combustion. When present, the booster can include a supercharger and/or a turbocharger.

Engine 10 can include a mechanism for delivering gaseous fuel to the combustion chamber. In the illustrated embodiment, engine 10 includes an electronically-controlled fuel injector 60 positioned for delivering substantially carbon-free fuel directly into the combustion chamber. A fuel injector positioned to inject fuel directly into the combustion chamber can be subjected to a much harsher environment than a port-type fuel injector that injects fuel into the intake manifold. The task of injecting hydrogen fuel into this hostile environment in the short time period allowed by high speed operation often means the injector must operate at high internal pressure (above about 150 bar or 2200 PSI). The direct proximity of the fuel injector to the combustion reaction can lead to high internal fuel injector temperatures. In addition to the harsh environment, fuel injector 60 does not benefit from the lubricating properties of a liquid fuel. To the contrary, fuel injector 60 uses a gaseous fuel, and in the presently described embodiment, hydrogen gas, which can actually reduce lubrication by cleaning the injector.

Engine 10 can include a controller 70. In some embodiments, the controller can include a processor 72, input/output ports 74, electronically programmable memory 76, random access memory 78, and/or other components. Controller 70 can be configured to receive various signals from sensors coupled to engine 10 via ports 74. Such received signals can include, but are not limited to: measurements of inducted mass air flow (MAF) from a mass air flow sensor 80; and measurement of manifold pressure (MAP) from a manifold pressure sensor 82. Controller 70 can be used to control intake valve 32, fuel injector 60, booster 50, and/or a variety of other engine components. For example, controller 70 can be used to send injector 60 a pulse-width-modulated signal, which can control the ejection of fuel from the fuel injector.

Engine 10 can also include one or more exhaust gas treatment devices configured to limit undesired tailpipe emissions. For example, engine 10 can include a $NO_x$ trap 90 configured to absorb feedgas $NO_x$. As illustrated, the $NO_x$ trap is downstream of booster 50. In some embodiments, the $NO_x$ trap can be upstream of booster 50. In some embodiments, the $NO_x$ trap can be purged with on-board $H_2$. Additional or alternative exhaust gas treatment devices may be used while remaining within the scope of this disclosure.

Figure 2A:
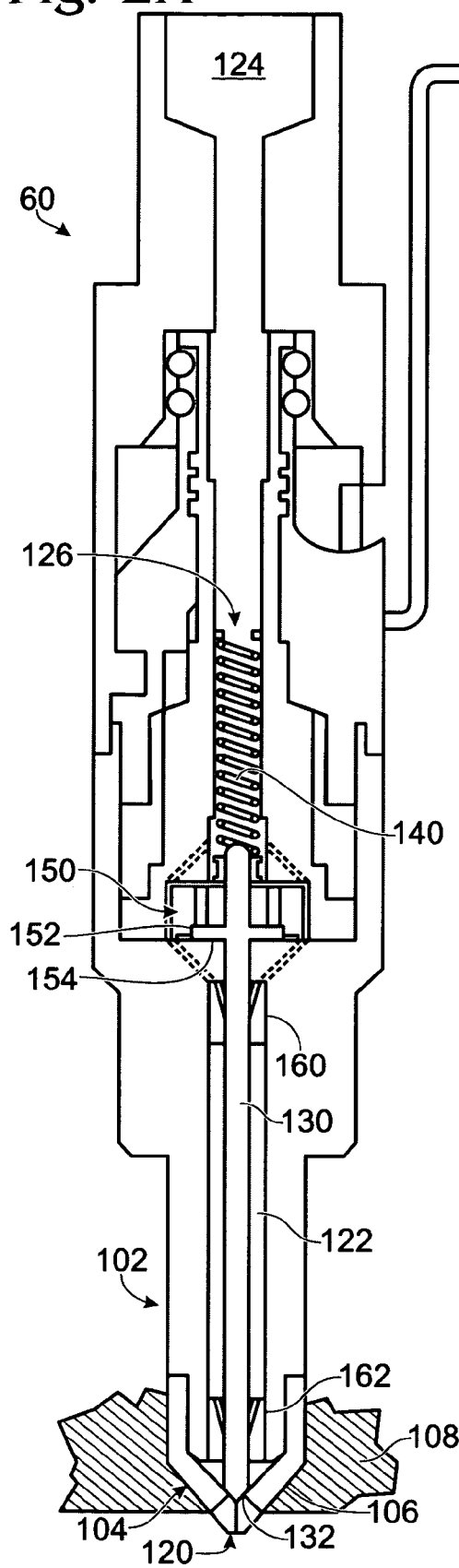
FIG. 2A shows a cross section view of a hydrogen fuel injector configured for direct injection.

FIG. 2a shows electronically controlled fuel injector 60 in more detail. Fuel injector 60 is designed to mitigate the harshness of directly injecting a gaseous fuel into a combustion chamber. Known direct hydrogen fuel injectors are installed into the cylinder head and combustion chamber through a machined clearance and use an o-ring or sleeve-type seal near the tip. Such an arrangement exposes a relatively large portion of the tip to the heat of combustion and insulates the injector body from the surrounding cylinder head, which can be water cooled, thus limiting the ability of the cylinder head to transfer heat away from the injector. As a result, component wear, seizing, galling, leaking, and other unfavorable results often arise under the harsh, non-lubricated conditions. Such unfavorable conditions can arise in as little as five minutes.

Fuel injector 60 includes a nozzle 102 that can help mitigate at least some of the above described challenges faced when directly injecting gaseous fuel into a combustion chamber. For example, nozzle 102 includes a tip 104 having tapered portions 106. The tapered shape of the tip allows the cylinder head to shield much of the fuel injector from direct exposure to the combustion chamber. In other words, the tapered shape of the tip allows most of the tip, other than the opening through which fuel is ejected, to be positioned so that at least some of a cylinder head 108 is intermediate the tip and the combustion chamber.

In some engines, the cylinder heads may be actively cooled, such as by water and/or air cooling. Furthermore, cylinder heads can be relatively good thermal conductors. Therefore, the internal temperature of a fuel injector can be decreased by increasing the relative area of the injector that is exposed to the cylinder head and by decreasing the relative area of the injector that is exposed to the combustion chamber.

Figure 2B:
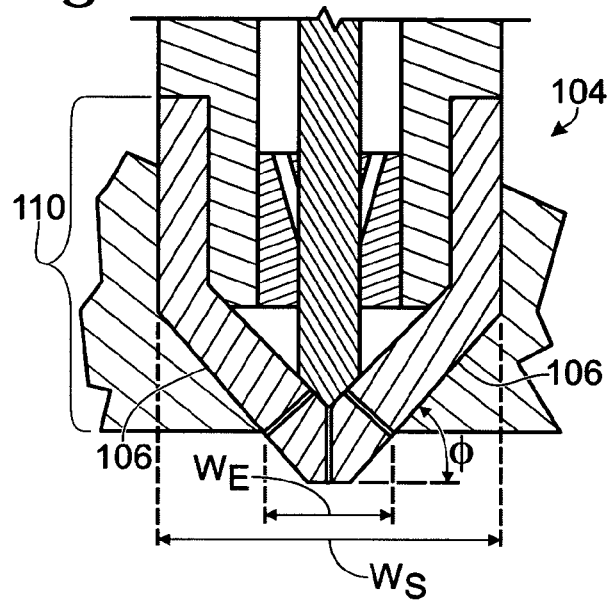
FIG. 2B shows an enlarged cross section view of the nozzle of the hydrogen fuel injector of FIG. 2A.

FIG. 2b shows a more detailed view of tip 104. As can be seen, tapering the injector tip allows a portion 110 of the tip to be shielded from the combustion chamber by the cylinder head. The tip can be positioned to thermally communicate with the cylinder head, thus allowing the cylinder head to transfer heat away from the injector if the temperature of the injector exceeds the temperature of the cylinder head. In different embodiments, a taper angle $\phi$ of the tip relative to the inner surface of the combustion chamber can be between about 20 degrees and 70 degrees. Larger taper angles can increase the amount of cylinder head material between portions of the tip and the combustion chamber, and smaller taper angles can allow for a relatively wider nozzle. The tip can have an exposed width of the tip $W_E$ that is less than the shielded width of the tip $W_S$. In some embodiments, $W_E$ can be less than 75% of $W_S$ and is some embodiments, $W_E$ can be less than 50% of $W_S$.

Turning back to FIG. 2a, nozzle 102 includes an opening 120 through which hydrogen can be delivered from the fuel injector. Opening 120 can be sized and shaped to deliver a desired amount of hydrogen at a given pressure when the nozzle is opened for a specific duration. Opening 120 is in fluid communication with a fuel channel 122, through which fuel flows. Fuel channel 122 includes an inlet portion 124 into which hydrogen fuel is received from a fuel rail. The fuel channel includes a cavity portion 126 leading from inlet portion 124 to nozzle opening 120. In some embodiments, a fuel channel can include two or more inlets and/or two or more cavities/fuel paths between the inlet and the nozzle opening. In some embodiments, the nozzle opening may include two or more separate orifices. The hydrogen delivered to the fuel channel can be pressurized, thus encouraging delivery of the hydrogen to the fuel injector and/or injection of the fuel to the cylinder by the injector.

Fuel injector 60 includes a pintle 130 that can be selectively opened and closed. When closed, the pintle at least substantially, if not completely, blocks fluid passage between cavity 126 and opening 120. Thus, the pintle can stop the flow of pressurized fuel out of the injector and into the combustion chamber. On the other hand, when the pintle is opened, pressurized gaseous fuel is introduced from the nozzle directly into the combustion chamber. Pintles can be variously sized and shaped to cooperate with the nozzle to create a selectively open-and-closable opening through which fuel can be ejected. In the illustrated embodiment, pintle 130 is an elongated member that has a tip 132 that is sized and shaped to seal opening 120. While pintle 130 is provided as an exemplary mechanism for selectively starting and stopping the flow of gaseous fuel, virtually any other mechanism that selectively starts and stops the flow of gaseous fuel can be used without departing from the scope of this disclosure.

Fuel injector 60 can include a pintle controller, which is configured to selectively move the pintle between the closed position and the opened position. In some embodiments, pintle controller includes an electromagnet that is configured to change an electric and/or magnetic field in response to receiving a control signal. The pintle can respond to the changing electric and/or magnetic field by moving between an opened position and a closed position.

In the embodiment described above, where the pintle is moved in response to a changing electric and/or magnetic field, the signal that is delivered to the pintle controller effectively controls the duration that the nozzle is opened. In some embodiments, a pulse-width-modulated signal is delivered to the controller. The frequency, duty cycle, and/or other attributes of the signal can be selected so that the pintle controller produces the desired electric and/or magnetic field, which in turn causes the pintle to open for a desired duration. For example, a signal having a longer duty cycle can cause the pintle to open for longer than a signal having a shorter duty cycle. A signal having a higher frequency can cause the pintle to open and close more rapidly. The frequency of the pintle can be continuously changed to correspond to changing engine speeds, so that fuel is delivered to the cylinder at desired times, regardless of engine speed.

In some embodiments, the fuel injector can include a spring that biases the pintle in one of the opened or closed positions. In the illustrated embodiment, spring 140 biases pintle 130 in a closed position. The relative strength of the spring can affect the opening and closing behavior of the pintle. For example, a stronger spring can cause the pintle to more rapidly move from an opened position to a closed position, which in some embodiments can facilitate precisely controlling the amount of fuel that is ejected.

In some embodiments, the operational life of a fuel injector can be improved by limiting aggressive impacts when the pintle moves from the opened position to the closed position (and/or vice versa). FIG. 2 shows a nonlimiting example of a mechanism that is configured to decrease closing impulse. Dampener 150 includes opposing surfaces 152 and 154, which move relative to one another when the pintle moves. The distance between the surfaces, and the volume between the surfaces, increases as the pintle opens and decreases as the pintle closes. A fluid in the volume between the surfaces can serve as a cushion when the pintle moves from the opened position to the closed position. As the distance between the surfaces decreases, the fluid between the surfaces is compressed and/or is displaced, thus causing the closing pintle to at least partially decelerate (or at least limit acceleration as to what would occur if not for the dampener), particularly at the end of the movement from the opened position to the closed position. In this way, the relative violence of the impact can be lessened, thus promoting fuel injector longevity. In some embodiments, the gaseous fuel can be used as the fluid dampener. In some embodiments, a dampener can be configured with one or more vents, which allow the dampener fluid to move from between the opposing surfaces (e.g., to cavity 126 or opening 120). The area of the two opposing surfaces and/or the venting may be adjusted to provide the desired rate of closure. In some embodiments, a check valve may be used to facilitate filling the dampener with a cushioning fluid and to limit a vacuum lock from delaying pintle opening. In general, any mechanism designed to utilize a fluid (e.g., hydrogen gas) as a cushion can improve the longevity of the fuel injector. It is believed that a fluid cushion may be able to withstand the relatively harsh conditions of direct injection longer than an elastomer cushion.

The alignment of pintle 130 is important to successfully limiting pressurized gaseous fluid from leaking out of opening 120. If the pintle becomes substantially misaligned, the pressurized gaseous fuel can leak into the combustion chamber, even when the pintle is in the closed position. This is not desirable because it makes it difficult, if not impossible, to precisely control the amount of fuel available for combustion. Accordingly, the fuel injector can include one or more bearing-type devices, which are configured to direct the pintle as it moves and ensure it properly seals the nozzle opening when in the closed position. A variety of different bearing-type devices can be used while remaining within the scope of this disclosure. In the illustrated embodiment, a nonlimiting gas bearing arrangement is used. The gas bearing arrangement includes spaced apart first and second gas bearings. The first gas bearing 160 is relatively distal tip 104, while the second gas bearing 162 is relatively proximate tip 104. The proximity of the second gas bearing to the tip, and opening 120, improves placement control of the pintle at the tip. In other words, in many embodiments, pintle alignment can be improved by using a bearing-type device near the tip.

Some alignment devices are not suited for being placed proximate to the tip of the fuel injector, and thus the combustion reaction, because the heat from the combustion reaction can adversely affect the ability of the alignment device to direct the pintle as it moves. For example, some standard bearing arrangements rapidly degrade when located near the tip. If the bearings are located away from the trip, they may not degrade as quickly, but they may not provide as good of alignment as a working bearing that is located proximate the tip.

Figure 3:
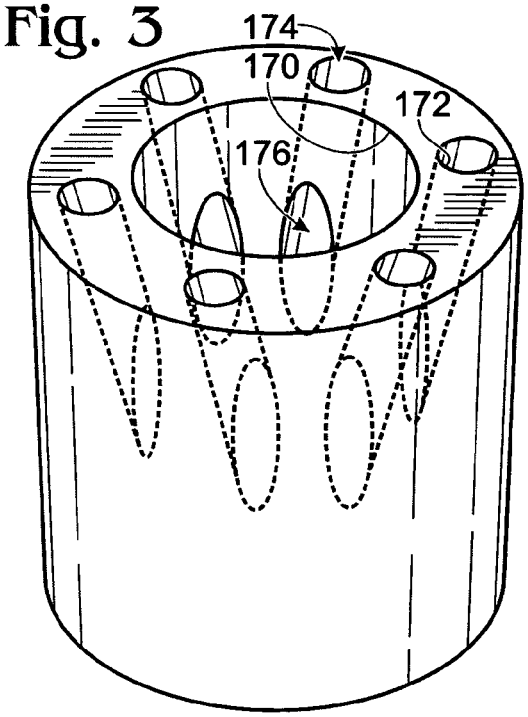
FIG. 3 shows a gas bearing of FIG. 2A.

In some embodiments, gas bearings that do not include components which are easily degraded can be used. FIG. 3 shows a nonlimiting example of a gas bearing portion (e.g., 160 or 162) of fuel injector 60. In some embodiments, the gas bearing portion can be a discrete component and in some embodiments the gas bearing portion can be combined with one or more other components and/or integrated into the main construction of the fuel injector. The gas bearing portion includes a channel 170 through which pintle 130 can move. The gas bearing portion also includes a plurality of bearing ports 172 through which pressurized gas, such as pressurized gaseous fuel, can be directed. This may also be accomplished by other arrangements, such as an internal annular recess, or groove, with the pressurized gaseous fuel supplied through one or more ports, grooves, or channels. The bearing ports can be spaced around a diameter of channel 170, such as in a pattern of one or more rings. As shown, one end 174 of the bearing ports can be outside channel 170, while another end 176 is within the channel. Pressurized gas can enter the bearing port at end 174 and leave the bearing port at end 176. The gas flowing through the ports can act to center the pintle in channel 170, thus creating a very low friction, if not frictionless, passage through which the pintle can move. As a nonlimiting example, if the total port area at channel 170 is ⅛ square inches, then it is expected that a gas pressure of 2,200 PSI may provide a force of over 30 pounds acting to center the pintle. Higher gas pressures could generate greater pintle centering forces.

The bearing ports and the pintle clearance can be configured to accommodate the maximum flow requirements of the engine at wide-open throttle, and/or in some embodiments, a bypass orifice can be added. The fuel flow requirements are dependant on the engine performance goals and cylinder displacement.

While the above describe gas bearing arrangement may be well suited for improving fuel injector longevity, it is believed that other bearing arrangements could additionally or alternatively be used. In particular, any bearing arrangement that limits mechanical contact, such as another type of gas bearing, an electromagnetic bearing, or the like can be used. It is believed that bearing arrangements that can be located proximate tip 104 may be able to improve pintle alignment, and thus limit leakage.

The invention claimed is:

1. A hydrogen fuel injector, comprising:
   a hydrogen fuel channel configured to receive pressurized gaseous hydrogen fuel from a hydrogen fuel rail, the hydrogen fuel rail having tolerances sufficiently small so as to substantially prevent hydrogen molecules from leaking;
   a nozzle in fluid communication with the hydrogen fuel channel, wherein the nozzle includes tapered portions configured to be seated adjacent a cylinder head;
   a pintle having an opened position and a closed position, wherein pressurized gaseous hydrogen fuel is introduced from the nozzle directly into a combustion chamber when the pintle is in the opened position and wherein introduction of the pressurized gaseous hydrogen fuel is substantially blocked when the pintle is in the closed position;
   a pintle controller configured to selectively move the pintle between the closed position and the opened position; and
   a hydrogen gas dampener configured to lessen impact of pintle closing.

2. The hydrogen fuel injector of claim 1, wherein the tapered portions are between about 20 and 70 degrees relative to an inner surface of the cylinder head.

3. The hydrogen fuel injector of claim 1, wherein at least some of the tapered portions are shielded from the combustion chamber by the cylinder head.

4. The hydrogen fuel injector of claim 1, wherein at least 50% of surface area of the tapered portions are shielded from the combustion chamber by the cylinder head.

5. The hydrogen fuel injector of claim 1, wherein the pintle controller includes an electronically controlled solenoid.

6. The hydrogen fuel injector of claim 1, wherein the hydrogen gas dampener uses the gaseous hydrogen fuel as a cushion to lessen impact of pintle closing.

7. A hydrogen fuel injector, comprising:
   a hydrogen fuel channel configured to receive pressurized gaseous hydrogen fuel from a hydrogen fuel rail, the hydrogen fuel rail having tolerances sufficiently small so as to substantially prevent hydrogen molecules from leaking;
   a nozzle in fluid communication with the hydrogen fuel channel, wherein the nozzle includes tapered portions configured to be seated adjacent a cylinder head;
   a pintle having an opened position and a closed position, wherein pressurized gaseous hydrogen fuel is introduced from the nozzle directly into a combustion chamber when the pintle is in the opened position and wherein introduction of the pressurized gaseous hydrogen fuel is substantially blocked when the pintle is in the closed position;
   a pintle controller configured to selectively move the pintle between the closed position and the opened position; and
   a gas bearing mechanism located proximate the nozzle and configured to align the pintle.

8. A hydrogen fuel injector, comprising:
   a hydrogen fuel channel configured to receive pressurized gaseous hydrogen fuel from a hydrogen fuel rail, hydrogen fuel rail having tolerances sufficiently small so as to substantially prevent hydrogen molecules from leaking;
   a nozzle in fluid communication with the hydrogen fuel channel, wherein the nozzle includes tapered portions configured to be seated adjacent a cylinder head;
   a pintle having an opened position and a closed position, wherein pressurized gaseous hydrogen fuel is introduced from the nozzle directly into a combustion chamber when the pintle is in the opened position and wherein introduction of the pressurized gaseous hydrogen fuel is substantially blocked when the pintle is in the closed position;
   a pintle controller configured to selectively move the pintle between the closed position and the opened position; and
   spaced-apart gas bearings configured to align the pintle.

9. The hydrogen fuel injector of claim 8, wherein the spaced-apart gas bearings use the gaseous hydrogen fuel to align the pintle.

10. A fuel injector, comprising:
    a fuel channel configured to receive pressurized gaseous fuel from a fuel rail;
    a nozzle in fluid communication with the fuel channel, wherein the nozzle includes a tip configured to be seated against a cylinder head;
    a pintle having an opened position and a closed position, wherein pressurized gaseous fuel is introduced from the nozzle directly into a combustion chamber when the pintle is in the opened position and wherein introduction of the pressurized gaseous fuel is substantially blocked when the pintle is in the closed position;
    a gas dampener including a first portion that moves with the pintle and a second portion that is fixed relative the nozzle, wherein a gas cushion exists between the first and second portions when the pintle is in the opened position, and wherein the gas cushion at least partially limits the first portion and the second portion moving toward one another, thereby at least partially slowing the pintle as it moves from the opened position to the closed position; and
    a pintle controller configured to selectively move the pintle between the closed position and the opened position.

11. The fuel injector of claim 10, wherein the gas cushion includes the gaseous fuel.

12. The fuel injector of claim 10, wherein the gas dampener includes a check valve configured to allow gas cushion formation when the pintle moves from the closed position to the open formation.

13. The fuel injector of claim 10, further comprising a spring configured to bias the pintle in the closed position.

14. The fuel injector of claim 10, wherein the nozzle includes tapered portions configured to be seated adjacent a cylinder head.

15. The fuel injector of claim 10, further comprising a gas bearing configured to align the pintle.

16. A fuel injector, comprising:
    a fuel channel configured to receive pressurized gaseous fuel from a fuel rail;
    a nozzle in fluid communication with the fuel channel;
    a pintle having an opened position and a closed position, wherein pressurized gaseous fuel is delivered from the nozzle when the pintle is in the opened position and wherein delivery of the pressurized gaseous fuel is substantially blocked when the pintle is in the closed position;
    a gas bearing assembly configured to align the pintle relative the nozzle; and a pintle controller configured to selectively move the pintle between the closed position and the opened position.

17. The fuel injector of claim 16, wherein the gas bearing assembly includes a gas bearing mechanism proximate the nozzle and a gas bearing mechanism distal the nozzle.

18. The fuel injector of claim 16, wherein the gas bearing assembly includes at least one set of bearing ports spaced around a channel through which the pintle moves.

19. The fuel injector of claim 16, wherein the gas bearing assembly includes an internal annular recess where pressurized gas can align the pintle.

20. A fuel injector, comprising:
a fuel channel configured to receive pressurized gaseous fuel from a fuel rail;
a nozzle in fluid communication with the fuel channel;
a pintle having an opened position and a closed position, wherein pressurized gaseous fuel is delivered from the nozzle when the pintle is in the opened position and wherein delivery of the pressurized gaseous fuel is substantially blocked when the pintle is in the closed position;
a gas bearing assembly proximate the nozzle and configured to align the pintle relative the nozzle; and
a pintle controller configured to selectively move the pintle between the closed position and the opened position.

21. The fuel injector of claim 20, wherein the bearing mechanism includes a gas bearing mechanism.

* * * * *